US012125333B2

(12) United States Patent
Davidar et al.

(10) Patent No.: US 12,125,333 B2
(45) **Date of Patent: *Oct. 22, 2024**

(54) TECHNIQUES TO DISPENSE AN ITEM AND RELEASE A JAMMED ITEM FROM A DISPENSING SYSTEM

(71) Applicant: Trinity Axis Inc., Harleysville, PA (US)

(72) Inventors: David D. Davidar, Schwenksville, PA (US); Jeremiah Divyan David, Tamil Nadu (IN)

(73) Assignee: Trinity Axis Inc., Harleysville, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/114,162

(22) Filed: Feb. 24, 2023

(65) Prior Publication Data

US 2023/0222860 A1 Jul. 13, 2023

Related U.S. Application Data

(63) Continuation of application No. 17/382,479, filed on Jul. 22, 2021, now Pat. No. 11,620,868.

(51) Int. Cl.
*G07F 11/42* (2006.01)
*G07F 11/72* (2006.01)

(52) U.S. Cl.
CPC .............. *G07F 11/42* (2013.01); *G07F 11/72* (2013.01)

(58) Field of Classification Search
CPC ........................................................ G07F 11/42
See application file for complete search history.

(56) References Cited

U.S. PATENT DOCUMENTS 3,723,737 A 3/1973 Zeldman et al.
3,805,061 A 4/1974 De Missimy et al.
3,844,394 A 10/1974 Hale et al.
4,252,250 A 2/1981 Toth
4,266,124 A 5/1981 Weber et al.
4,359,147 A 11/1982 Levasseur
(Continued)

FOREIGN PATENT DOCUMENTS

CA 1148258 6/1983
CA 3012964 9/2017
(Continued)

OTHER PUBLICATIONS

Office Action Summary for U.S. Appl. No. 17/382,479 dated Jul. 25, 2022.

(Continued)

*Primary Examiner* — Gene O Crawford
*Assistant Examiner* — Ayodeji T Ojofeitimi
(74) *Attorney, Agent, or Firm* — C. Tumey Law Group PLLC

(57) ABSTRACT

Systems and methods of the present disclosure relate to dispensing and jammed item release techniques. A dispensing system comprises an arrangement of passages; a first device operable to move in a lateral direction along the arrangement of passages; a second device operable to move in a vertical direction along the arrangement of passages; a third device operable to extend or retract into a passage; and a cover operable to move toward and away from the arrangement of passages.

19 Claims, 14 Drawing Sheets

(56) References Cited

U.S. PATENT DOCUMENTS

| | | | | |
|---|---|---|---|---|
| 4,412,607 | A | 11/1983 | Collins et al. | |
| 4,553,211 | A | 11/1985 | Kawasaki et al. | |
| 4,560,088 | A | 12/1985 | Tan | |
| 4,573,606 | A | 3/1986 | Lewis et al. | |
| 4,634,855 | A | 1/1987 | Friend et al. | |
| 4,696,413 | A | 9/1987 | Wilson et al. | |
| 4,776,487 | A | 10/1988 | Kurosawa et al. | |
| 4,847,629 | A | 7/1989 | Shimazaki | |
| 4,854,477 | A | 8/1989 | Kurosawa et al. | |
| 4,981,027 | A | 1/1991 | Friedman et al. | |
| 5,111,962 | A | 5/1992 | Oden | |
| 5,149,921 | A | 9/1992 | Picado | |
| 5,496,996 | A | 3/1996 | Barnes et al. | |
| 5,651,476 | A | 7/1997 | Percy et al. | |
| 5,911,763 | A | 6/1999 | Quesada | |
| 5,927,539 | A | 7/1999 | Truitt et al. | |
| 5,945,824 | A | 8/1999 | Obara et al. | |
| 6,023,064 | A | 2/2000 | Burgin | |
| 6,142,317 | A | 11/2000 | Merl | |
| 6,367,653 | B1 | 4/2002 | Ruskin et al. | |
| 6,382,431 | B1 | 5/2002 | Burke | |
| 6,397,193 | B1 | 5/2002 | Walker et al. | |
| 6,409,027 | B1 | 6/2002 | Chang et al. | |
| 6,478,187 | B2 | 11/2002 | Simson et al. | |
| 6,499,627 | B2 | 12/2002 | Arai | |
| 6,520,373 | B1 | 2/2003 | Neely et al. | |
| 6,575,363 | B1 | 6/2003 | Leason et al. | |
| 6,640,994 | B2 | 11/2003 | Chen | |
| 6,644,495 | B2 | 11/2003 | Ruskin et al. | |
| 6,691,891 | B2 | 2/2004 | Maldonado | |
| 6,695,166 | B2 | 2/2004 | Long | |
| 6,732,014 | B2 | 5/2004 | Whitten et al. | |
| 6,755,322 | B1 | 6/2004 | Herzog et al. | |
| 6,772,906 | B2 | 8/2004 | Wittern, Jr. et al. | |
| 6,825,656 | B2 | 11/2004 | Hanisch | |
| 6,870,286 | B2 | 3/2005 | Nakamoto et al. | |
| 6,911,747 | B2 | 6/2005 | Tsuboi et al. | |
| 6,920,372 | B2 | 7/2005 | Nickerson et al. | |
| 6,962,267 | B2 | 11/2005 | Herzog et al. | |
| 6,996,538 | B2 | 2/2006 | Lucas | |
| 7,073,683 | B1 | 7/2006 | Quinnell et al. | |
| 7,086,560 | B2 | 8/2006 | Shioya | |
| 7,139,616 | B2 | 11/2006 | May et al. | |
| 7,164,884 | B2 | 1/2007 | Defosséet al. | |
| 7,191,915 | B2 | 3/2007 | Hair, III et al. | |
| 7,222,748 | B2 | 5/2007 | Holdway et al. | |
| 7,246,562 | B2 | 7/2007 | Lee et al. | |
| 7,286,901 | B2 | 10/2007 | Whitten et al. | |
| 7,299,109 | B2 | 11/2007 | Juds et al. | |
| 7,325,728 | B2 | 2/2008 | Arora et al. | |
| 7,327,267 | B2 | 2/2008 | Tsunoda | |
| 7,343,220 | B2 | 3/2008 | Hair, III et al. | |
| 7,385,504 | B2 | 6/2008 | Agrawal et al. | |
| 7,401,710 | B2 | 7/2008 | Black, Jr. et al. | |
| 7,446,302 | B2 | 11/2008 | Mason et al. | |
| 7,451,891 | B2 | 11/2008 | Carter et al. | |
| 7,456,526 | B2 | 11/2008 | Teramachi et al. | |
| 7,513,390 | B2 | 4/2009 | Artsiely | |
| 7,519,451 | B2 | 4/2009 | Hartnell et al. | |
| 7,562,595 | B2 | 7/2009 | Kato | |
| 7,562,816 | B2 | 7/2009 | Abraham et al. | |
| 7,565,222 | B2 | 7/2009 | Popelka | |
| 7,660,647 | B2 | 2/2010 | Ruskin et al. | |
| 7,690,519 | B2 | 4/2010 | Kahl et al. | |
| 7,745,963 | B2 | 6/2010 | Jenny | |
| 7,787,988 | B2 | 8/2010 | Whitten et al. | |
| 7,802,700 | B2 | 9/2010 | Ardern et al. | |
| 7,805,338 | B2 | 9/2010 | Kolls | |
| 7,823,750 | B2 | 11/2010 | Carter et al. | |
| 7,831,335 | B2 | 11/2010 | Bautista et al. | |
| 7,837,058 | B2 | 11/2010 | Collins et al. | |
| 7,837,059 | B2 | 11/2010 | Hieb et al. | |
| 7,845,375 | B2 | 12/2010 | Dorney | |
| 7,857,161 | B2 | 12/2010 | Pinney et al. | |
| 7,878,082 | B2 | 2/2011 | Yamagishi | |
| 7,886,930 | B2 | 2/2011 | Carter et al. | |
| 7,904,199 | B2 | 3/2011 | Carter et al. | |
| 8,002,144 | B2 | 8/2011 | Percy | |
| 8,046,100 | B2 | 10/2011 | Whitten et al. | |
| 8,061,555 | B2 | 11/2011 | Guglielmi et al. | |
| 8,160,742 | B2 | 4/2012 | Goerg et al. | |
| 8,162,174 | B2 | 4/2012 | Hieb et al. | |
| 8,386,074 | B2 | 2/2013 | Smith, III et al. | |
| 8,463,431 | B2 | 6/2013 | Segal et al. | |
| 8,534,494 | B2 | 9/2013 | Black, Jr. et al. | |
| 8,548,625 | B2 | 10/2013 | Whitten et al. | |
| 8,556,119 | B2 | 10/2013 | Shavnak et al. | |
| 8,561,491 | B2 | 10/2013 | Fukano et al. | |
| 8,631,969 | B2 | 1/2014 | Faes | |
| 8,674,563 | B2 | 3/2014 | Lamouree et al. | |
| 8,706,293 | B2 | 4/2014 | Lu | |
| 8,788,341 | B1 | 7/2014 | Patel et al. | |
| 8,881,945 | B2 | 11/2014 | Gasper et al. | |
| 8,911,042 | B2 | 12/2014 | Bassi et al. | |
| 8,925,405 | B2 | 1/2015 | Kawabuchi et al. | |
| 8,960,588 | B2 | 2/2015 | Byrd et al. | |
| 8,973,452 | B2 | 3/2015 | Fukano et al. | |
| 8,988,374 | B2 | 3/2015 | Weng et al. | |
| 8,998,005 | B2 | 4/2015 | Hardy | |
| 9,103,420 | B2 | 8/2015 | Wu | |
| 9,142,078 | B2 | 9/2015 | Lin et al. | |
| 9,167,896 | B1 | 10/2015 | Wu | |
| 9,218,085 | B2 | 12/2015 | Hwang et al. | |
| 9,245,403 | B2 | 1/2016 | Geigel et al. | |
| 9,262,377 | B2 | 2/2016 | Garson et al. | |
| 9,333,646 | B2 | 5/2016 | Boyer et al. | |
| 9,336,545 | B2 | 5/2016 | Shimmerlik et al. | |
| 9,357,856 | B2 | 6/2016 | Szpak et al. | |
| 9,433,305 | B2 | 9/2016 | Bird et al. | |
| 9,472,043 | B2 | 10/2016 | Mockus et al. | |
| 9,492,357 | B2 | 11/2016 | MacVittie et al. | |
| 9,523,215 | B2 | 12/2016 | Denison et al. | |
| 9,569,912 | B2 | 2/2017 | Faes | |
| 9,576,419 | B2 | 2/2017 | Carpentier et al. | |
| 9,629,479 | B2 | 4/2017 | Sosso et al. | |
| 9,640,014 | B2 | 5/2017 | Pritchard et al. | |
| 9,659,427 | B2 | 5/2017 | Stinson | |
| 9,679,287 | B2 | 6/2017 | Curtis | |
| 9,685,025 | B2 | 6/2017 | Sternowski et al. | |
| 9,710,992 | B2 | 7/2017 | Borra | |
| 9,820,585 | B2 | 11/2017 | Hardy et al. | |
| D812,945 | S | 3/2018 | Turner et al. | |
| 9,926,737 | B2 | 3/2018 | Wanjohi | |
| 10,055,928 | B1 | 8/2018 | Van Horn | |
| 10,174,522 | B2 | 1/2019 | Denison et al. | |
| 10,380,822 | B2 | 8/2019 | Signorelli et al. | |
| 10,392,217 | B2 | 8/2019 | Case et al. | |
| D866,663 | S | 11/2019 | Mäkelä et al. | |
| 10,490,014 | B2 | 11/2019 | Jafa et al. | |
| 10,512,351 | B1 | 12/2019 | Valeriano et al. | |
| 10,526,142 | B2 | 1/2020 | Jin et al. | |
| 10,535,214 | B2 | 1/2020 | Nooli et al. | |
| 2001/0000610 | A1 | 5/2001 | Johnson | |
| 2002/0107610 | A1 | 8/2002 | Kaehler et al. | |
| 2003/0006241 | A1 | 1/2003 | Johnson | |
| 2003/0020499 | A1 | 1/2003 | Bass | |
| 2003/0111482 | A1 | 6/2003 | Wittern, Jr. et al. | |
| 2003/0178435 | A1 | 9/2003 | Yamaguchi | |
| 2003/0201275 | A1 | 10/2003 | Tamura | |
| 2004/0108327 | A1 | 6/2004 | Baack et al. | |
| 2004/0140317 | A1 | 7/2004 | Forte | |
| 2005/0043856 | A1 | 2/2005 | Bautista et al. | |
| 2005/0155977 | A1 | 7/2005 | Popelka | |
| 2005/0251287 | A1 | 11/2005 | Thornton et al. | |
| 2006/0029395 | A1 | 2/2006 | Kim et al. | |
| 2007/0084875 | A1* | 4/2007 | Percy | G07F 11/16 221/258 |
| 2008/0275771 | A1 | 11/2008 | Levine | |
| 2009/0084812 | A1* | 4/2009 | Kirschner | A47F 1/126 221/1 |
| 2010/0268792 | A1 | 10/2010 | Butler et al. | |
| 2011/0210942 | A1 | 9/2011 | Kitamori et al. | |
| 2012/0012603 | A1 | 1/2012 | Whitten et al. | |
| 2013/0036672 | A1 | 2/2013 | Westerfield | |

(56) References Cited

U.S. PATENT DOCUMENTS

| | | | |
|---|---|---|---|
| 2013/0152377 A1 | 6/2013 | Garson et al. |
| 2014/0091696 A1 | 4/2014 | Welker et al. |
| 2014/0195041 A1 | 7/2014 | Hoormann |
| 2015/0021348 A1 | 1/2015 | Stinson |
| 2015/0310694 A1 | 10/2015 | Will et al. |
| 2016/0123521 A1 | 5/2016 | Raabe et al. |
| 2017/0083932 A1 | 3/2017 | Galinos |
| 2017/0228958 A1 | 8/2017 | Shimmerlik et al. |
| 2019/0251776 A1 | 8/2019 | Adelberg et al. |

FOREIGN PATENT DOCUMENTS

| | | |
|---|---|---|
| CN | 104392547 | 3/2015 |
| CN | 106408758 | 2/2017 |
| CN | 109064638 | 12/2018 |
| CN | 109191688 | 1/2019 |
| CN | 106228688 | 3/2019 |
| CN | 109448228 | 3/2019 |
| CN | 109523703 | 3/2019 |
| CN | 111302053 | 6/2020 |
| CN | 111325912 | 6/2020 |
| DE | 102011082371 | 3/2013 |
| EP | 1076320 | 2/2001 |
| EP | 2006812 | 12/2008 |
| EP | 2138983 | 12/2009 |
| EP | 2568452 | 3/2013 |
| EP | 3696777 | 2/2020 |
| ES | 2390176 | 11/2012 |
| ES | 2473641 | 7/2014 |
| ES | 2726798 | 10/2019 |
| GB | 2170792 | 8/1986 |
| GB | 2516276 | 1/2015 |
| JP | 2006164050 | 6/2006 |
| JP | 4228805 | 12/2008 |
| JP | 5113628 | 10/2012 |
| JP | 5884395 | 3/2016 |
| KR | 19990055546 | 7/1999 |
| KR | 100699032 | 3/2007 |
| KR | 100848431 | 7/2008 |
| KR | 102065970 | 1/2020 |
| WO | 2000030961 | 6/2000 |
| WO | 20000074009 | 12/2000 |
| WO | 2018017629 | 1/2018 |
| WO | 2019022626 | 1/2019 |
| WO | 2020081892 | 4/2020 |
| WO | 2020107276 | 6/2020 |

OTHER PUBLICATIONS

Notice of Allowance for U.S. Appl. No. 17/382,479 dated Jan. 19, 2023.

* cited by examiner

TECHNIQUES TO DISPENSE AN ITEM AND RELEASE A JAMMED ITEM FROM A DISPENSING SYSTEM

BACKGROUND

Dispensing systems may dispense a variety of items, including beverages, food, and other consumer products. Some dispensing systems may utilize rotating coils to dispense products stocked within the coils. These coils may be rotated by a motor, and during rotation of the coil, the products carried therein may be dispensed. The dispensing systems may be configured to accommodate specific product parameters, and vendors may spend a considerable amount of time stocking products within these coils.

For beverage container dispensing, dispensing systems may utilize rotating cradles that receive a beverage container. These cradles may also be sized for specific product parameters; vendors may employ a variety of shims, rods, sleeves, and other equipment to adjust vending geometry as desired. Requiring these additional components to accommodate different products may be undesirable, costly to manufacture, and increases overall assembly time. Additionally, some of these dispensing systems may employ overly complex cam mechanisms and switches that may fail overtime and require constant servicing or maintenance.

SUMMARY

Disclosed herein are exemplary systems and methods for dispensing items and releasing jammed items. A dispensing system comprises an arrangement of passages; a first device operable to move in a lateral direction along the arrangement of passages; a second device operable to move in a vertical direction along the arrangement of passages; a third device operable to extend or retract into a passage; and a cover operable to move toward and away from the arrangement of passages.

Further disclosed herein is an exemplary method for dispensing an item. The method comprises opening a cover, the cover operable to move to and from an arrangement of passages; moving an xy-mechanism along a first axis and a second axis of the system; and moving a member in a direction along a third axis into a passage.

Further disclosed herein is an exemplary method for releasing a jammed item. The method comprises: moving a member into a dispensing passage a second time; moving a cover in a first direction and a second direction relative to the dispensing passage; and moving the member and the cover simultaneously.

BRIEF DESCRIPTION OF THE DRAWINGS

These drawings illustrate certain aspects of some examples of the present disclosure and should not be used to limit or define the disclosure.

DETAILED DESCRIPTION

Figure 1:
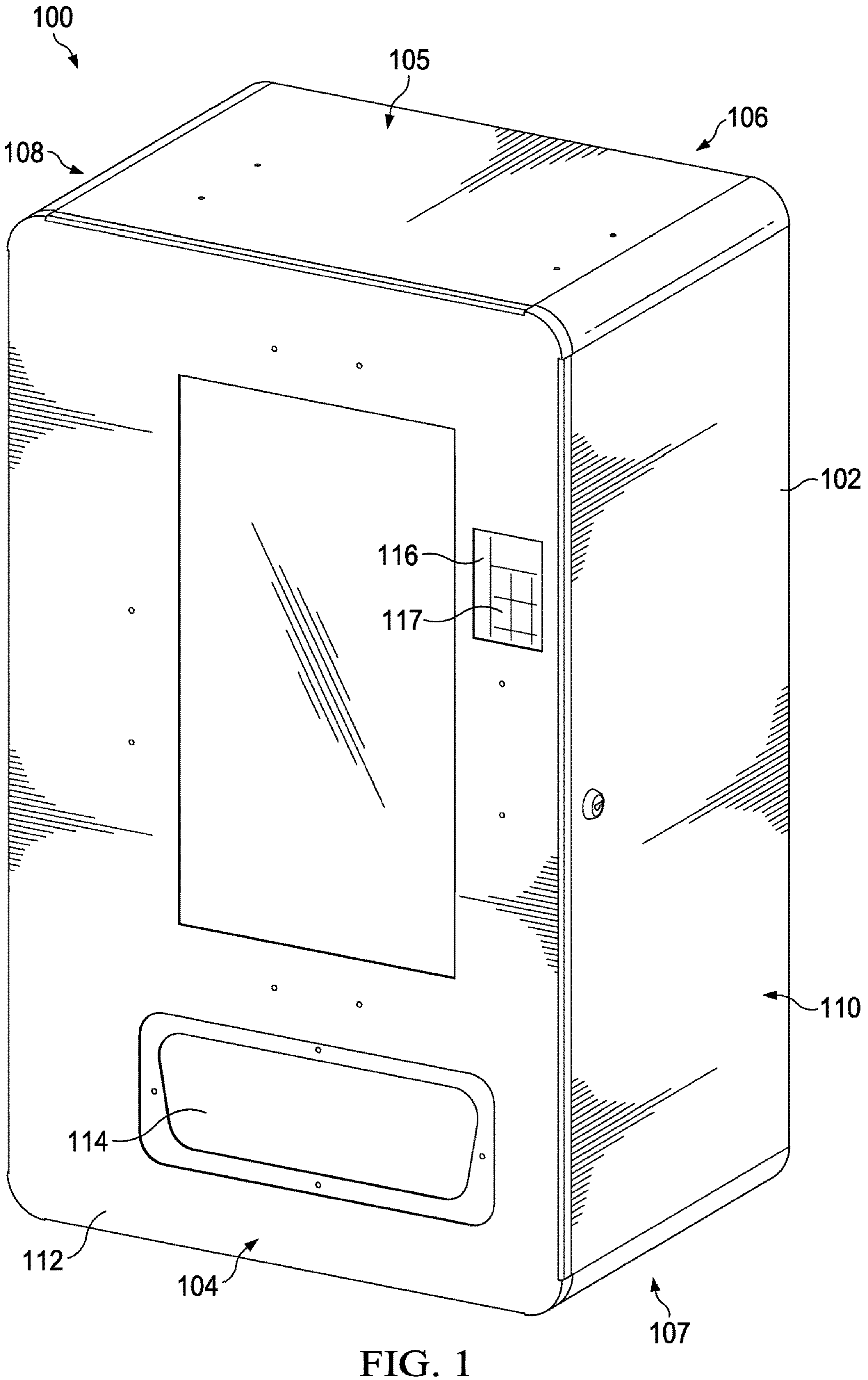
FIG. 1 illustrates a dispensing system, in accordance with examples of the present disclosure.

It is to be understood that the present disclosure is not limited to particular devices or methods, which may, of course, vary. It is also to be understood that the terminology used herein is for the purpose of describing particular embodiments only and is not intended to be limiting. All numbers and ranges disclosed herein may vary by some amount. Whenever a numerical range with a lower limit and an upper limit is disclosed, any number and any included range falling within the range are specifically disclosed. Although individual embodiments are discussed herein, the invention covers all combinations of all those embodiments. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. If there is any conflict in the usages of a word or term in this specification and one or more patent or other documents that may be incorporated herein by reference, the definitions that are consistent with this specification should be adopted for the purposes of understanding this invention.

The present disclosure generally relates to techniques for dispensing an item from a dispensing system and releasing a jammed item from the dispensing system. In some examples, a non-limiting example of the dispensing system may include a vending machine.

Some examples may utilize at least three axes to allow movement for a dispensing device of the dispensing system. The multiple axes may include at least an x-axis, a y-axis, and a z-axis that may allow for precise and quick dispensing of items that are stocked in the dispensing system.

Further, employment of at least three axes may allow for unobstructed stocking of products in the dispensing system without interference from surrounding components, such as the coils or the cradles, for example. Additionally, the utilization of the axes may require fewer components (e.g., the coils or cradles) than typical dispensing systems, resulting in fewer malfunctions such as an item not being dispensed after being purchased.

In particular examples, a wide variety of items such as consumer products may be arranged or stocked in an array of dispensing passages arranged in a grid of rows and/or columns within an interior section of the dispensing system. The dispensing passages may be horizontal and may extend from a rear of the dispensing system to a front of the dispensing system. In some examples, the dispensing device may be configured to move along a rear interior section of the dispensing system with access to products disposed or stacked within each dispensing passage of the grid. The dispensing passages may be disposed in front of the dispensing device and may be configured to receive an extendable member of the dispensing device. For example, after purchasing of a product, the dispensing device may move to align with a particular dispensing passage to dispense the product.

The dispensing device may be configured to move laterally and vertically within the interior section of the dispensing system. In particular examples, the dispensing device may be configured to move via rails. A lateral rail may be movably coupled to a vertical rail which may remain fixed or stationary within the dispensing system. The lateral rail may move vertically along the vertical rail, and the dispensing device may be movably disposed on the lateral rail, such that the dispensing device may move laterally along the lateral rail. Non-limiting configurations of the rails may include linear tracks with rollers, or a conveyor system. The rails may allow lateral alignment (e.g., x-axis) and vertical alignment (e.g., y-axis) of the dispensing device with each of the dispensing passages and products therein, while the dispensing device is configured to push the products along a z-axis which may extend longitudinally through each of the dispensing passages, such that the products fall from the dispensing passages into a retrieval bin that may be positioned at a bottom portion of the dispensing system for access by a consumer.

In some examples, the dispensing system may include a housing and an arrangement of the dispensing passages disposed within the housing. The lateral rail may extend laterally across the housing. The lateral rail may be configured to move in the vertical direction adjacent to the passages such as behind the passages, for example. The dispensing device may be disposed on the lateral rail and may be configured to move in a lateral direction and extend at least one member into a passage.

The dispensing device may include at least one extendable member that may extend and retract in a direction along a z-axis. In particular examples, the dispensing device may include telescoping members. The telescopic members may be concentrically disposed within one another and may be driven by an electric motor operatively coupled to a drive mechanism. A non-limiting example of the drive mechanism may include a chain and a sprocket, however, other suitable mechanisms may be utilized for extension and retraction of a dispensing member, as should be understood by one having skill in the art, with the benefit of this disclosure.

In some examples, the dispensing device may include a housing. A first movable structure and a second movable structure may be disposed within the housing. A member may extend from the first movable structure to the second movable structure. An extendable component may be disposed within the housing, and the extendable component may be configured to extend from the housing upon movement of at least the first movable structure, the second movable structure, or the member. An end of the member may be adjacent to the extendable component, and the dispensing device may be configured to move along an x-axis and a y-axis of a dispensing system. The dispensing device may be configured to extend the extendable component along a z-axis of the dispensing system.

An exemplary operative sequence for dispensing an item from the dispensing system may include moving the lateral rail in a direction along the y-axis of the dispensing system. The dispensing device may also move along the lateral rail in a direction along the x-axis of the dispensing system. After movement in the x and y directions, the dispensing device may extend at least one member in a direction along a z-axis of the dispensing system, into a dispensing passage to dispense an item.

In some examples, a dispensing technique allows a user to select and add a product to a cart in a home screen of the dispensing system. The dispensing system includes a user interface (e.g., graphical user interface (GUI)) that includes a software application which governs selection and dispensing of products. The software application may be displayed on an LCD screen with an LED backlight. An infrared (IR) touch panel may be fitted over the LCD screen which may receive user input.

Upon a successful payment transaction using the software application, the software application may transmit a command to a system controller to open a cover of the dispensing system. The cover may include a door or panel extending in a vertical direction. The cover may be operable to travel back and forth from the dispensing passages.

In a closed position, the cover may be disposed adjacent to the dispensing passages to prevent release of any items disposed therein. In an open position, the cover may not abut the dispensing passages such as to allow sufficient space for a particular item to be dispensed or drop from a dispensing passage. For example, as the cover opens by moving away from the dispensing passages, a space (e.g., an axial distance) therebetween is increased. During closing, the space may be decreased.

The system controller may instruct the cover to open from a closed position by moving away from a dispensing passage. Upon receiving a response from the system controller that the cover is open, the software application may transmit x and y coordinates (e.g., pulse values for an x-axis device/motor operable to provide movement along an x-axis of the dispensing system and a y-axis device/motor operable to provide movement along a y-axis of the dispensing system) of the product selected by the customer to the system controller. The system controller instructs the x-axis device and/or the y-axis device to move along the x-axis and/or the y-axis to the location of the selected product/item. The x-axis device and/or the y-axis device may be referred to as an xy-mechanism.

Upon receiving a response from the system controller that the xy-mechanism has moved from an initial position (e.g., calibration position) to the location of the selected product, the software application may determine whether a size (e.g., a maximum dimension) of the selected product is sufficient to move (e.g., fall) from a dispensing passage into the retrieval bin for access by the customer. Upon confirmation, the software application may transmit a pulse value to the system controller for pushing the selected product using a dispensing device in a forward direction along a z-axis (e.g., a dispensing direction) of the dispensing system, for a first time.

After a delay of $n_1$ seconds, the system controller may instruct the dispensing device to retract (e.g., move in a backward direction for the same pulse value) and the power supply to an IR sensor may be turned on. The IR sensor may be positioned to detect a presence of a dispensed product in the retrieval bin of the dispensing system.

Then, the IR sensor which may be placed at a bottom area of the dispensing system may start detecting for a presence or absence of the dispensed product. If IR sensor detects the presence of dispensed product, the system controller may send a response to the software application that the product has been dispensed successfully, and the system controller may instruct the IR sensor to cease detecting. If the IR sensor does not detect any presence of the dispensed product within $n_2$ seconds of detection, a jammed item release technique may be initiated. In examples where dispensing multiple products is performed, an algorithm may be deployed for calculating which product is to be dispensed first and the logical sequence for collecting those dispensed products from the retrieval bin of the dispensing system.

Upon receiving a response from the system controller that the product has been dispensed successfully, the software application sends a command to the system controller to open a gate to allow access into the retrieval bin for retrieval of the vended item. For example, the system controller may instruct hardware to energize the gate and associated motor (e.g., servomotor and a solenoid lock) to unlock/open or lock/close the gate. The solenoid lock may be de-energized to a lock position after approximately $n_3$ seconds. Whenever the solenoid lock is energized, the coil in the solenoid receives a pulse of high inrush current which can cause the coil to overheat if energized over a minute. A slider cam of the solenoid lock may allow the gate to return to the closed position, but it may not allow it to move to an open position unless the solenoid lock is energized to the unlock position.

Once the gate is opened, the IR sensor placed at a dispensing area (e.g., the retrieval bin) starts detecting whether the dispensed product has been retrieved by the customer.

If the customer has retrieved the product, the IR sensor may detect the absence of the product in the dispensed area and the system controller confirms by sending a response to the software application that the product has been picked up by the customer.

The system controller may also instruct the IR sensor to cease detection as the dispensed product has been retrieved and the power supply to IR sensor may be turned off. Upon receiving a response from the system controller that the product has been retrieved by the customer, the software application sends a command to the system controller to close the gate. The system controller may instruct the hardware to close the gate (i.e., the servomotor is de-energized to close the gate). Upon receiving a response from the controller that the gate is closed, the software application sends a reset position command to the system controller to return the xy-mechanism to the calibration position.

Upon receiving the reset position command from the software application, the system controller may instruct the hardware to move the xy-mechanism (from the current location of the last selected product) to the calibration position. The pulse values for the x-axis device and the y-axis device for moving the xy mechanism to a calibration position may be calculated based on the value of the most recent x and y coordinates stored in the system controller.

Upon receiving a response from the system controller that the xy-mechanism is returned to calibration position, the software application may send a command to the system controller to close the cover (e.g., communication with a sensor and a motor on the cover. The software application may receive a response from the system controller that the cover is moved to a closed position. The aforementioned exemplary sequence may complete a vend cycle operation for dispensing a single product.

In certain examples, a jammed item release technique may utilize a multi-stage sequence for releasing a jammed item from the dispensing system. During Stage 1, the system controller may instruct the dispensing device to push the jammed product. The dispensing device may use the same z motor pulse value received from the software application for pushing the selected product for the second time.

During Stage 2, if the infrared (IR) sensor does not detect any presence of a dispensed product in the retrieval bin after Stage 1, the system controller may instruct the cover (e.g., via communication with motor and sensor on the cover) to move away from the dispensing passages for $p_1$ pulses and toward the dispensing passages for $p_2$ pulses.

During Stage 3, if the IR sensor does not detect any presence of the dispensed product after Stage 2, the system controller may instruct the cover motor to move the cover away from the dispensing passages for $p_1$ pulses, and the dispensing device to push the selected product again for a third time while simultaneously moving the cover toward the dispensing passages for $p_2$ pulses.

If the IR sensor does not detect any presence of the dispensed product after Stage 3, the system controller transmits a machine failure response to the software application and may instruct hardware to open the gate. Upon receiving this response, the software application may display a Yes/No pop-up message to verify if the product has been retrieved by the customer.

If the customer provides the input as 'yes,' then the system identifies that there could be a possible issue with the IR sensor and may inform a vending management system (VMS). If the customer provides the input as 'no,' then the software application may inform the VMS to initiate relevant formalities as the customer did not receive the selected product.

Upon receiving the above-mentioned feedbacks from the software application, the system controller may instruct the hardware to close the gate. If the IR sensor detects the presence of the dispensed product after occurrence of any of the three stages mentioned above, the system controller may send a response to the software application indicating that the product has been dispensed successfully.

FIG. 1 illustrates a dispensing system 100, in accordance with examples of the present disclosure. The dispensing system 100 may include a housing 102 that houses internal components (not shown) of the dispensing system 100. As illustrated, the dispensing system 100 may include a front side 104, a top side 105, a rear side 106, a bottom side 107, a left lateral side 108, and a right lateral side 110. The front side 104 may include a door 112 (e.g., a hinged door or sliding door) which may be opened to allow access to an interior of the dispensing system 100 for servicing or stocking of consumer products, for example. The door 112 may include a gate 114 for access to purchased products that have fallen in a retrieval bin that is positioned behind the gate 114. In some examples, the gate 114 may be optional to allow open access to purchased products in the retrieval bin. In some examples, the dispensing system 100 may also include a system controller 116 configured to operate the dispensing system 100. In some examples, the system controller 116 may include a payment interface or validation interface.

The system controller 116 may include a display, a storage unit, and/or any instrumentality or aggregate of instrumentalities operable to compute, estimate, classify, process, transmit, receive, retrieve, originate, switch, store, display, manifest, detect, record, reproduce, handle, validate, or utilize any form of information, intelligence, or data for business, scientific, control, or other purposes. For example, the system controller 116 may be a computer, a network storage device, RFID scanner, NFC reader, validation device or any other suitable device and may vary in size, shape, performance, functionality, and price. The system controller 116 may include a processing unit (e.g., microprocessor, central processing unit, programmable logic controller (PLC), etc.) that may process data by executing software or instructions obtained from a local non-transitory computer readable media (e.g., optical disks, magnetic disks). The non-transitory computer readable media may store software or instructions of the methods described herein. Non-transitory computer readable media may include any instrumentality or aggregation of instrumentalities that may retain data and/or instructions for a period of time. The non-transitory computer readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

The system controller 116 may also include input device(s) (e.g., keyboard, mouse, touchpad, scanners, RFID readers, card readers, NFC readers, data reader devices, etc.) and output device(s) (e.g., monitor, printer, secondary display unit 117, etc.). The input device(s) and output device(s) provide a user interface. For example, the system controller 116 may enable an operator to select and perform analysis, view collected data, view analysis results, and/or perform other tasks.

Figure 2:
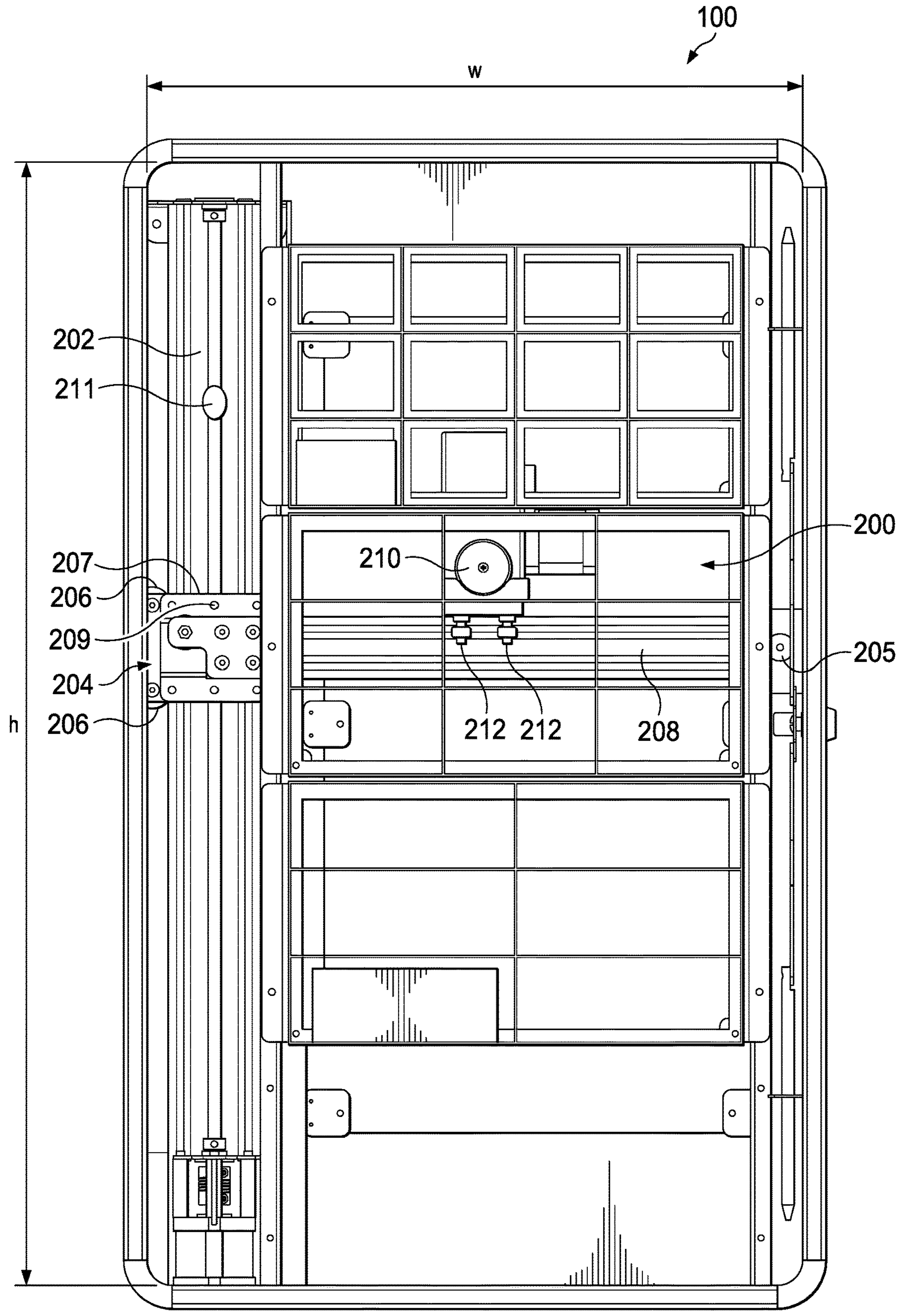
FIG. 2 illustrates an interior section of the dispensing system, in accordance with examples of the present disclosure.

FIG. 2 illustrates a rear view of an interior section 200 of the dispensing system 100, in accordance with examples of the present disclosure. The interior section 200 may include a vertical rail 202 extending along a height h of a rear of the interior section 200 of the dispensing system 100. The vertical rail 202 may be coupled or fixed to the interior section 200 with any suitable technique and may remain stationary. Suitable techniques for coupling of fixing the vertical rail 202 to the interior section 200 may include, but are not limited to, bolts, threads, or welds, for example.

In some examples, a movable structure 204 may include at least two rollers 206 and/or a nut block 207, each movably disposed on the vertical rail 202. In some examples, the nut block 207 may include a structure configured to move along the vertical rail 202 via a lead member 209 (e.g., a screw) that may extend into the rail 202 such as within a lead screw 211. The nut block 207 may move along the vertical rail 202 by any suitable means such as conveyor system and/or gears disposed within (or adjacent to) the vertical rail 202. In some examples, the vertical rail 202 may be configured as a linear track allowing the movable structure 204 to move vertically along the vertical rail 202. Other suitable techniques for facilitating movement of the moveable structure 204 on vertical rail 202 may be used such as a motor 205.

A lateral rail 208 may extend from the movable structure 204. The lateral rail 208 may extend laterally across a width w of the interior section 200 of the dispensing system 100, in some examples. The lateral rail 208 may move vertically along the vertical rail 202 via the movable structure 204. It should be noted that other suitable mechanisms may be utilized for vertical movement within the interior section 200 of the dispensing system 100, as should be understood by one having skill in the art with the benefit of this disclosure.

A dispensing device 210 may be movably disposed on the lateral rail 208. The dispensing device 210 may include rollers 212 that may contact the lateral rail 208. The dispensing device 210 may be configured to move laterally along the lateral rail 208.

The rollers 212 may be any suitable rollers for facilitating movement of the dispensing device 210 along the lateral rail 208. For example, the rollers 212 may be moved along the lateral rail 208 by a belt and pulley mechanism, and the lateral rail 208 may be configured as a linear track allowing the dispensing device 210 to move laterally along the lateral rail 208. It should be noted that other suitable mechanisms may be utilized for lateral movement within the interior section 200 of the dispensing system 100, as should be understood by one having skill in the art with the benefit of this disclosure such as for example a motor.

Figure 3:
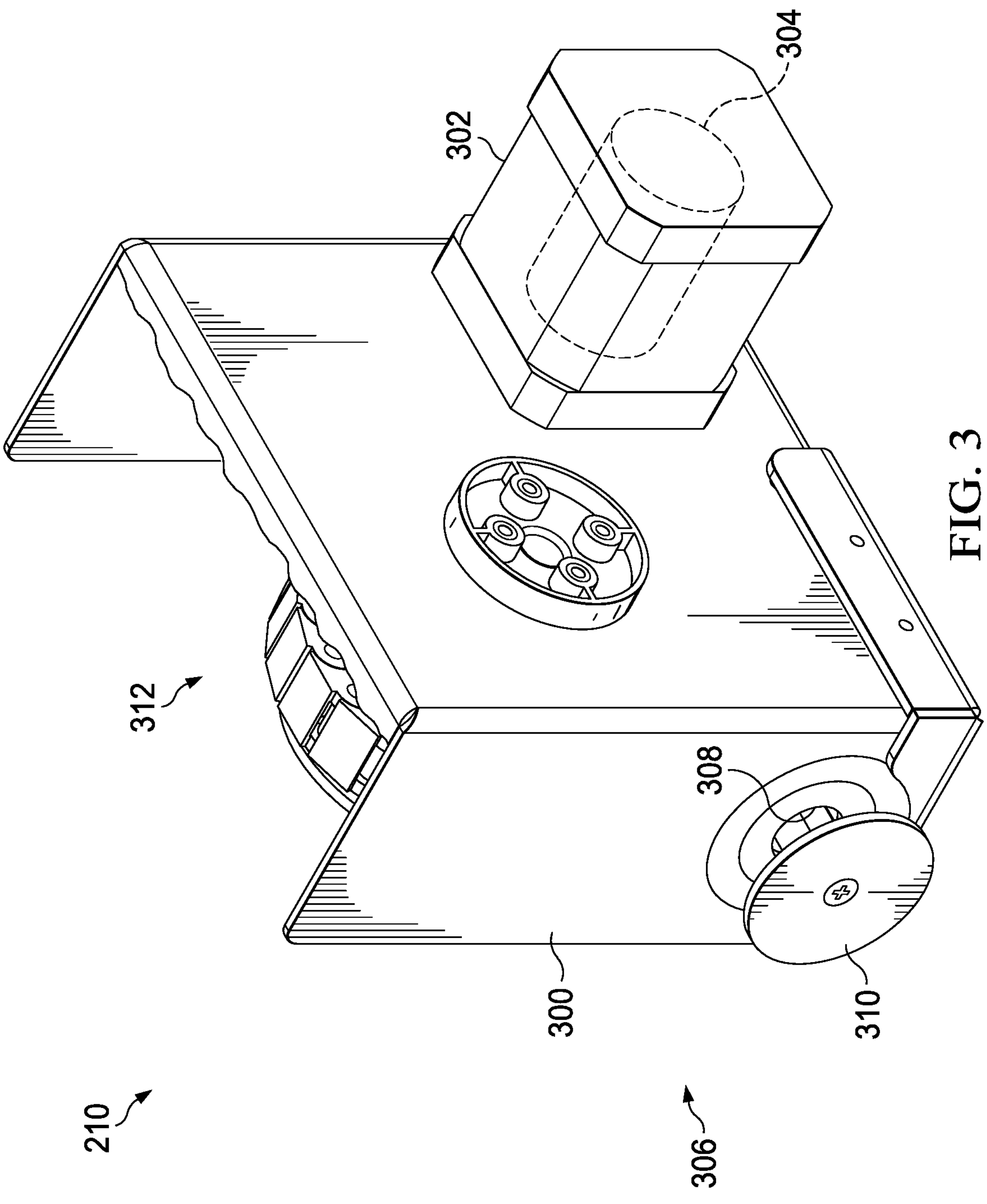
FIG. 3 illustrates a close-up perspective view of a dispensing device, in accordance with examples of the present disclosure.

FIG. 3 illustrates a close-up perspective view of the dispensing device 210, in accordance with examples of the present disclosure. The dispensing device 210 may include a housing 300. The housing 300 may be of any suitable shape such as rectangular, for example. A second housing 302 may be disposed adjacent to the housing 300. The second housing may also be of any suitable shape such as a rectangle, for example. The second housing 302 may contain an electric motor 304 which may be powered by any suitable means such as wires and an electric grid or a battery, for example.

An interior of the housing 300 may be in fluid communication with an interior of the second housing 302 to allow operation of the motor 304, for example. A front portion 306 of the housing 300 may include an aperture 308 which may allow at least one extendable member 310 to extend away from the housing 300. The member 310 may extend from an interior portion 312 of the housing 300 during dispensing of an item, or the member 310 may retract into the interior portion 312 after the dispensing.

Figure 4:
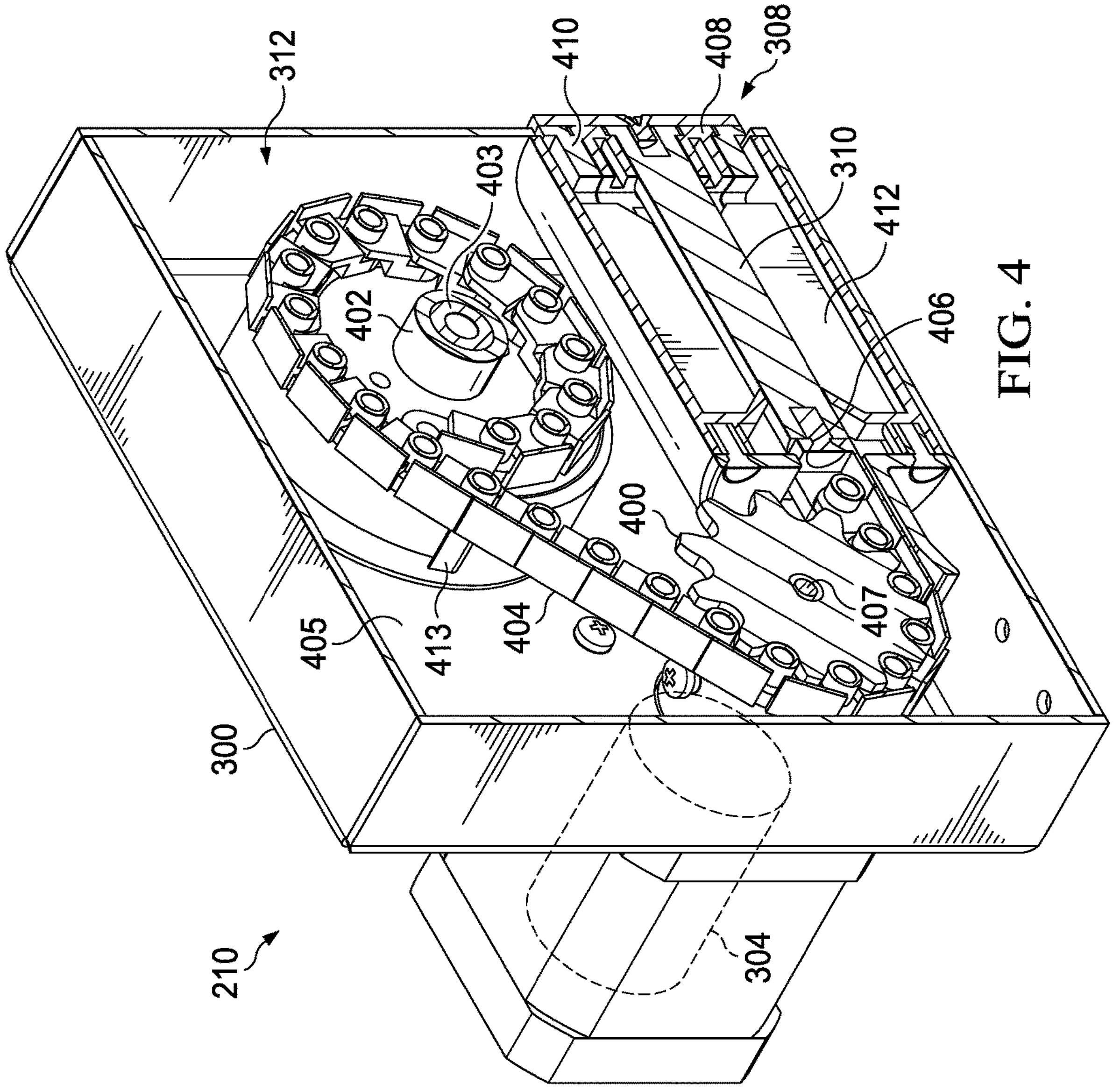
FIG. 4 illustrates an interior cross-sectional view of a dispensing device, in accordance with examples of the present disclosure.

FIG. 4 illustrates the interior portion 312 of the housing 300 of the dispensing device 210, in accordance with examples of the present disclosure. As illustrated, the housing 300 may contain a movable member (e.g., a sprocket 400), a spool 402, and member 404 (e.g., a chain). The motor 304 may be operatively coupled (e.g., via a shaft or direct coupling) to the movable member such as a sprocket 400 that may be rotatably disposed within the interior portion 312. The sprocket 400 may be adjacent to the spool 402. In some examples, the spool 402 may be configured to rotate. The sprocket 400 and the spool 402 may each be rotatably coupled to an inner surface of the interior portion 312. The sprocket 400, spool 402 and member 404 may be configured as a linear actuator. The spool 402 may rotate back to the coiled position by the assistance of a spring 413 that may be disposed adjacent to the spool 402 such as between an inner wall 405 of the housing 300 and the spool 402, for example. It should be noted that this configuration is a non-limiting example and other suitable linear actuators may be utilized for conversion of rotational movement of the motor 304 to linear movement, as should be understood by one having skill in the art with the benefit of this disclosure.

For example, a pin 403 may rotatably couple the spool 402 to the inner wall 405; and a shaft 407 may extend from the sprocket 400 through the inner wall 405 and to the motor 304. A member 404 may extend from the spool 402 to the sprocket 400 and may operatively couple the sprocket 400 to the spool 402. The member 404 may be configured to transfer rotational movement of the sprocket 400 to the extendable member 310. In some examples, the member 404 may include a chain that may be at least partially wound around the spool 402 and the sprocket 400. A distal end 406 of the member 404 may be coupled to at least one extendable member 310 configured to pass through the aperture 308. While member 404 is illustrated on FIG. 4 as a chain, other suitable devices may be used for transferring motion of the sprocket 400 to the extendable member 310, including, but not limited to, a belt.

In some examples, a plurality of extendable members may be disposed concentrically within the interior portion 312 of the dispensing device 210. For example, the extendable member 310 may be disposed within extendable members 408 and 410. The extendable members 310, 408, and 410 may be disposed within a base 412 in a telescopic or concentric configuration. In other examples, the extendable members 310, 408, and 410 may be aligned eccentrically. The base 412 may be coupled to the interior portion 312 of the housing 300, such as to the inner wall 405, for example. The base 412 may be coupled to the interior portion 312 of the housing 300 via any suitable means such as fasteners including threads, welds, or pins, for example. As illustrated, the extendable members 310, 408, and 410 are in a retracted configuration; during dispensing, the extendable members 310, 408, and 410 may extend in a telescopic fashion, for example. It should be noted that the telescopic configuration is a non-limiting example and that other suitable techniques for extension may be utilized, as should be understood by one having skill in the art, with the benefit of this disclosure. Examples of other techniques that could be used instead of telescopic members may include rack & pinion technique.

Figure 5:
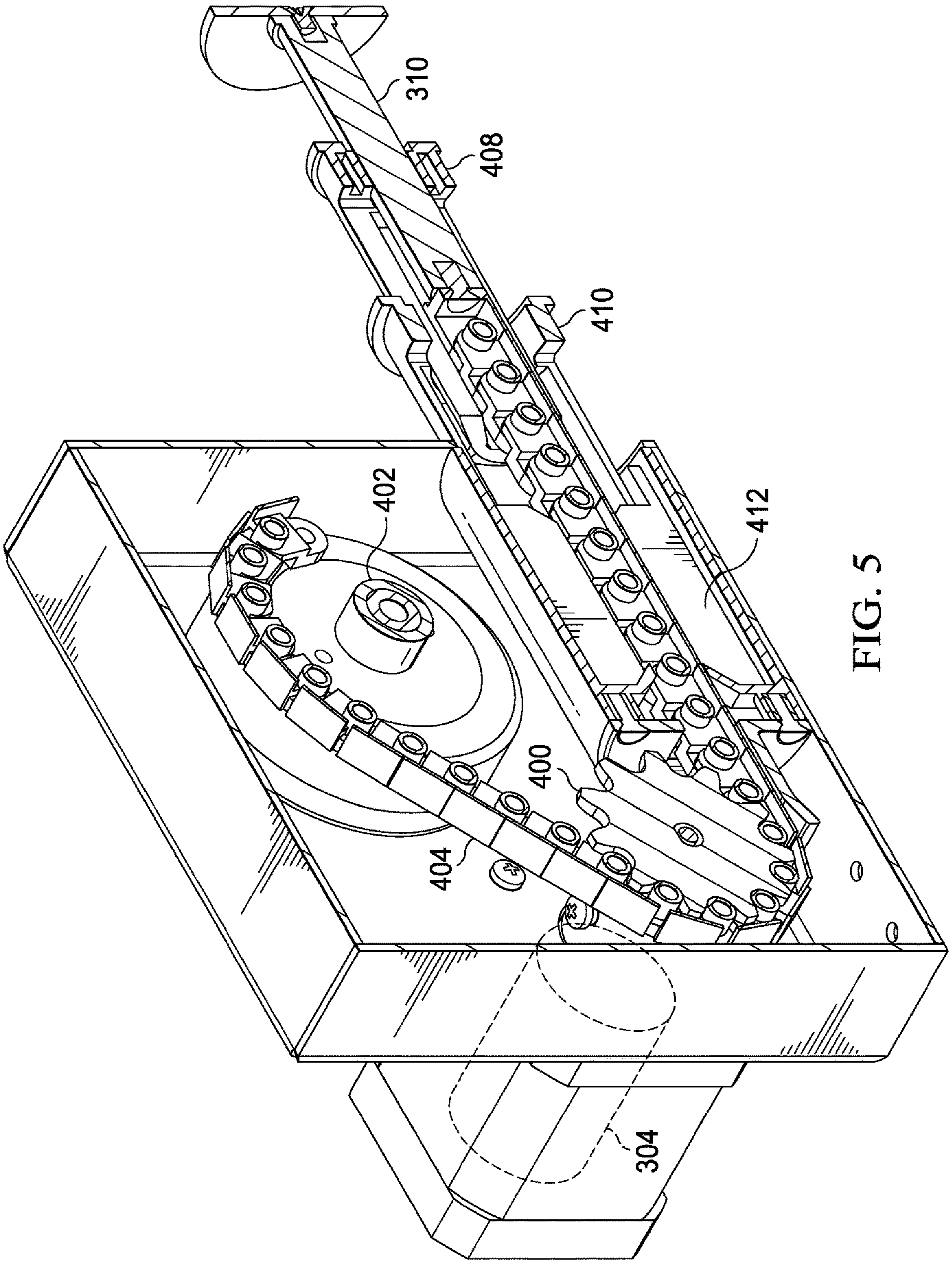
FIG. 5 illustrates extendable members in an extended configuration, in accordance with examples of the present disclosure.

FIG. 5 illustrates the extendable members 310, 408, and 410 in an extended configuration, in accordance with examples of the present disclosure. The extendable members 310, 408, and 410 may extend from the base 412 upon rotation of sprocket 400 by the motor 304. The rotation of the sprocket 400 may cause rotation of the spool 402 thereby causing at least partial unravelling of the member 404 from around the spool 402, thereby causing extension of the extendable members 310, 408, and 410. In some examples, the extendable members 310, 408, and 410 may extend from the base 412 telescopically, as shown. Each of the extendable members 310, 408, 410, and the base 412 may have outer diameters (OD) and inner diameters (ID) that are configured to allow retraction and extension in a telescopic fashion.

For example, an OD of the member 310 may be less than an ID of the member 408; an OD of the member 408 may be less than an ID of the member 410; and an OD of the member 410 may be less than an ID of the base 412. Each of the extendable members 310, 408, 410, and the base 412 may be hollow to allow for passage of the member 404 therethrough during extension and retraction. In some examples, the extendable members 310, 408, 410, and the base 412 may be tubular, however, any suitable shape may be utilized as should be understood by one having skill in the art with the benefit of this disclosure.

Figure 6:
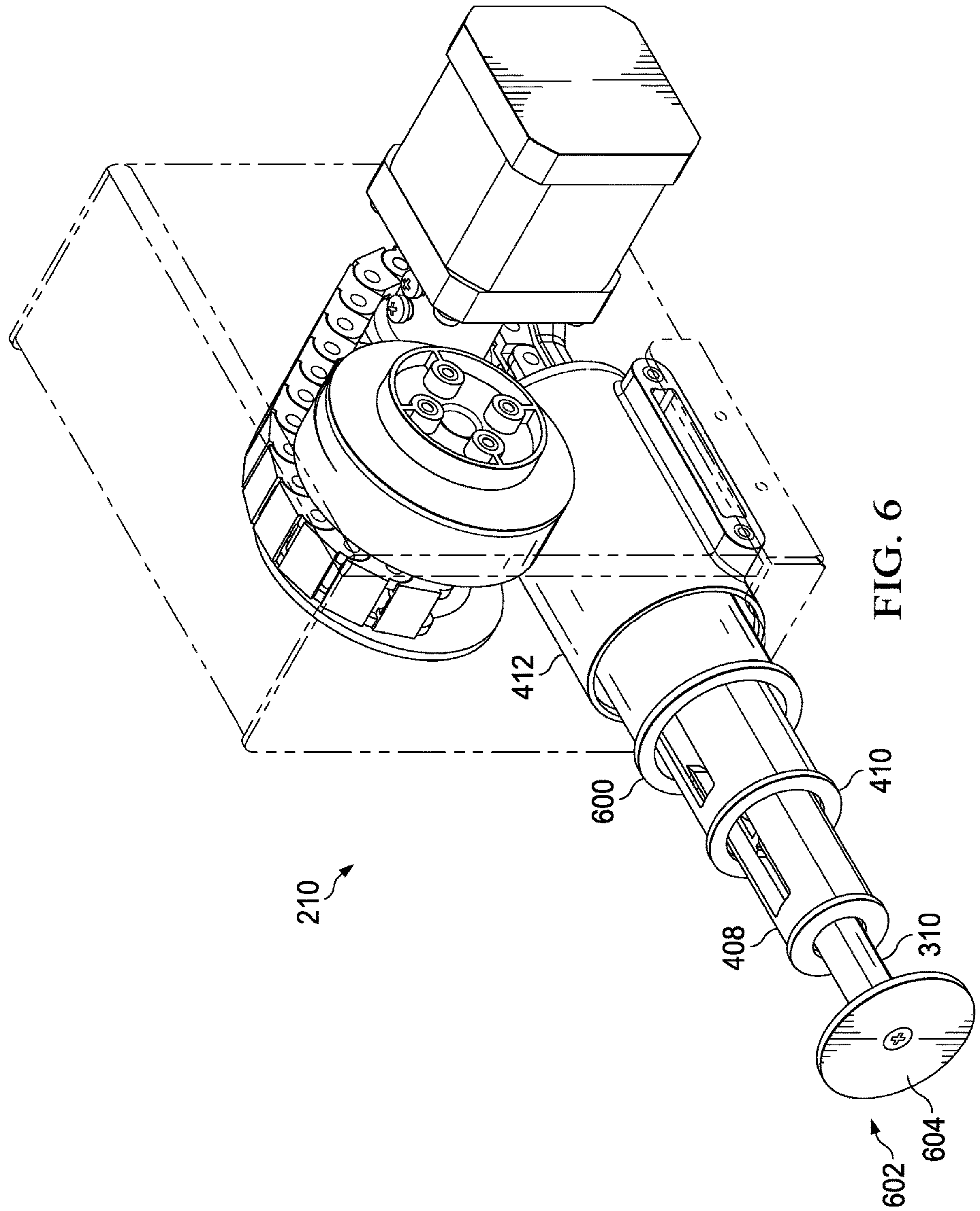
FIG. 6 illustrates a perspective view of a dispensing device, in accordance with examples of the present disclosure.

FIG. 6 illustrates a perspective view of the dispensing device 210, in accordance with examples of the present disclosure. In some examples, the dispensing device 210 may include the extendable members 310, 408, 410, and an additional extendable member 600 that may extend from the base 412 in a telescopic or concentric configuration. The extendable members 310, 408, 410, and 600 may be hollow to allow for passage of the member 404, as shown on FIG. 5.

In certain examples, the extendable member 310 may include a distal end 602 with a flat surface 604 to facilitate contacting and pushing items forward. It should be noted that the shapes and sizes for the extendable members 310, 408, 410, and 600 may be of any suitable shape. For example, the extendable members 310, 408, 410, and 600 may be of a cylindrical, box-type, prism, or rectangular shape.

Figure 7:
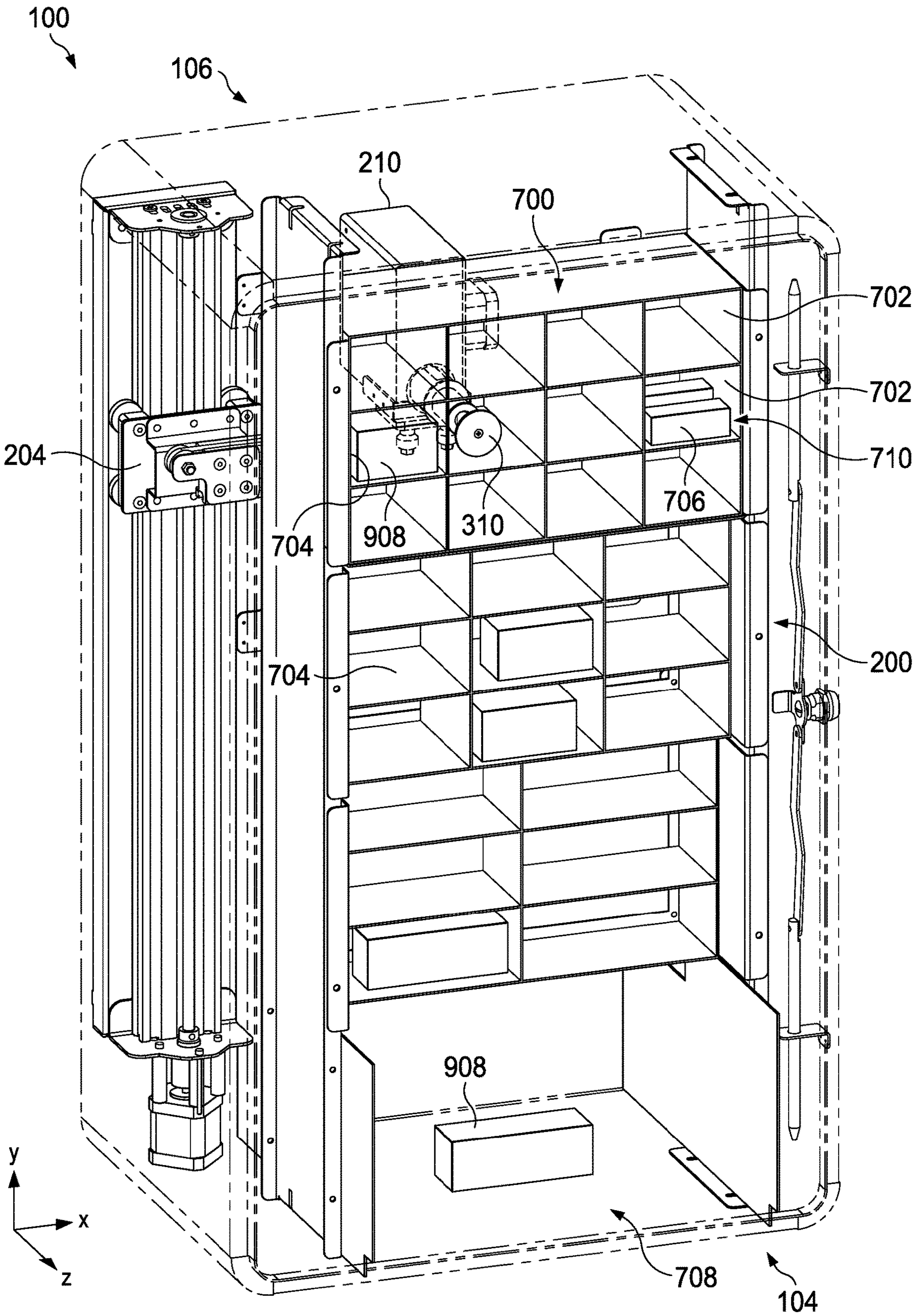
FIG. 7 illustrates a grid of dispensing passages arranged within the interior section of the dispensing system, in accordance with examples of the present disclosure.

FIG. 7 illustrates a grid 700 of dispensing passages 702 arranged within the interior section 200 of the dispensing system 100, in accordance with examples of the present disclosure. The dispensing passages 702 may include through-holes 704 extending horizontally from the rear side 106 of the dispensing system 100 to the front side 104 of the dispensing system 100. An item 706 such as a consumer product may be stocked or stacked within a dispensing passage 702. During dispensing, the movable structure 204 and the dispensing device 210 may move to align with the item 706 along the x-axis and the y-axis. Upon alignment, the dispensing device 210 may extend at least the extendable member 310 along the z-axis to push the item 706 such that the item 706 falls into a retrieval bin 708 for retrieval by a consumer. In some examples, a horizontal stack 710 of items 706 may be disposed within each dispensing passage 702. As items are dispensed, the horizontal stack 710 becomes shorter. In certain examples, the display unit 117 may include a touch screen display that may include a user interface to select or have access to the locations of items 706. In some examples, the system controller 116 may store a map or have access to the locations of the items 706.

Figure 8:
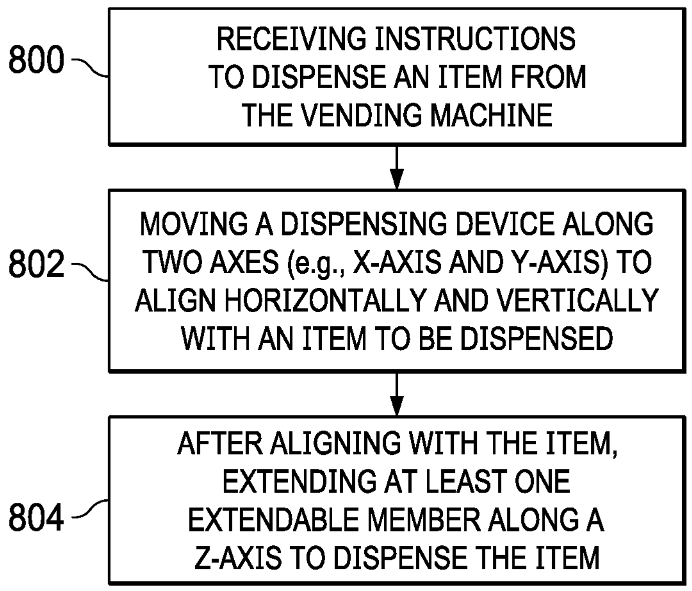
FIG. 8 illustrates an operative sequence for dispensing an item from a dispensing system, in accordance with examples of the present disclosure.

FIG. 8 illustrates a sequence for dispensing an item from a dispensing system, in accordance with particular examples of the present disclosure. At step 800, the system controller 116 (e.g., the touch screen display) may receive instructions to dispense an item 706 from the dispensing system 100, as shown on FIGS. 1 and 7, for example. At step 802, the dispensing device 210 may move along two axes (e.g., x-axis and y-axis) to align horizontally and vertically with an item 706 in a dispensing passage 702, as shown on FIGS. 2 and 7, for example. At step 804, after aligning with the item 706, the dispensing device 210 may extend at least one extendable member 310 along a z-axis to push the item 706 into the retrieval bin 708, as shown on FIG. 7, for example. After dispensing the item 706, the dispensing device 210 may retract the extendable member 310, as shown on FIG. 4, for example.

Figure 9:
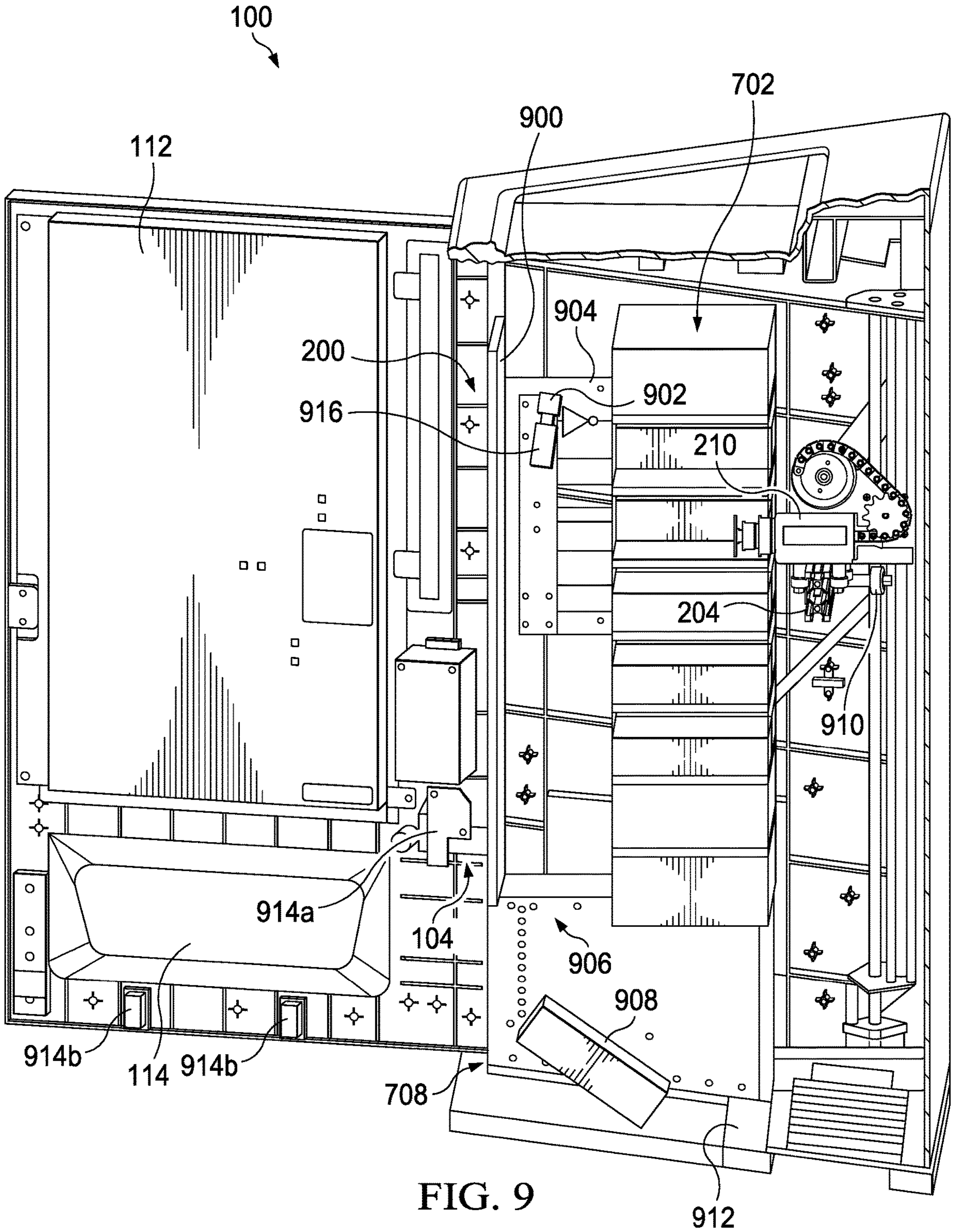
FIG. 9 illustrates a product cover of a dispensing system, in accordance with examples of the present disclosure.

FIG. 9 illustrates the dispensing system 100 with the door 112 open to reveal that the interior section 200 of the dispensing system 100 may further include a cover 900, in accordance with examples of the present disclosure. The cover 900 may include a door or panel extending across the dispensing passages 702 at a front side 104 of the dispensing system 100. The cover 900 may be operable to travel back and forth from the dispensing passages 702. For example, the cover 900 may be attached to a motor 902 which may move the cover 900 along a rail 904.

Upon a successful payment transaction using a software application, the software application may transmit a command to the system controller 116 (shown on FIG. 1) to open (e.g., move away from the dispensing passages 702) a cover 900 of the dispensing system. In a closed position, the cover 900 may be disposed adjacent to the dispensing passages 702 to prevent release of any items disposed therein.

In an open position, the cover 900 may be axially spaced apart from the dispensing passages 702 such as to form a sufficiently sized space 906 for a particular item 706 to be dispensed or drop from a dispensing passage 702. For example, as the cover 900 opens by moving away from the dispensing passages 702, the space 906 (e.g., an axial distance) therebetween is increased. During closing, the space 906 may be decreased.

The system controller may instruct the cover to open from a closed position by moving away from a dispensing passage 702. Upon receiving a response from the system controller that the cover 900 is open, the software application may transmit x and y coordinates of the product selected by the customer to the system controller. For example, the coordinates may be transmitted as pulse values to: an x-axis device (e.g., the dispensing device 210) for movement along an x-axis to the selected product, and a y-axis device such as the movable structure 204 for movement along a y-axis to the selected product. The system controller may instruct the x-axis device and/or the y-axis device to move along the x-axis and/or the y-axis to the location of the selected product/item 706. The x-axis device and the y-axis device may be collectively referred to as an xy-mechanism 910.

Figure 10:
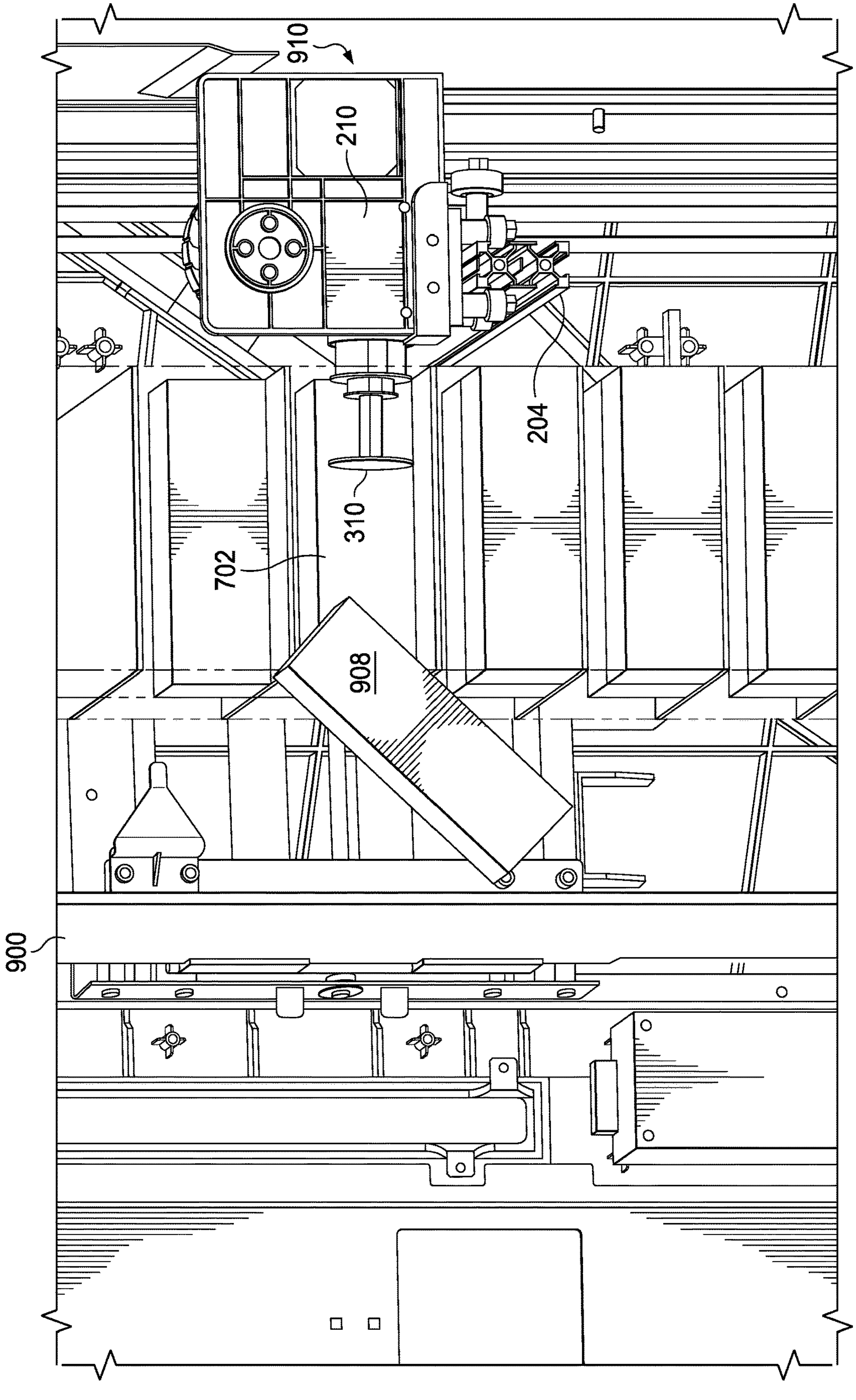
FIG. 10 illustrates a close-up view of the product cover of the dispensing system, in accordance with examples of the present disclosure.

FIG. 10 illustrates a close-up view of the cover 900, in accordance with examples of the present disclosure. Upon receiving a response from the system controller 116 (e.g., shown on FIG. 1) that the xy-mechanism has moved from an initial position (e.g., calibration position) to the location of the selected product 706, the software application may determine whether a size (e.g., a maximum dimension) of the selected product is sufficient to move (e.g., fall) from a dispensing passage 702 into the retrieval bin 708 (e.g., shown on FIG. 9) for access by the customer. Upon confirmation, the software application may transmit a pulse value to the system controller for pushing the selected product 706 using a dispensing device in a forward direction along a z-axis (e.g., extendable member 310), for a first time.

Referring back to FIG. 9, after a delay of $n_1$ seconds, the system controller may instruct the dispensing device to retract and the power supply to an IR sensor 912 may be turned on. The IR sensor 912 may be positioned to detect a presence of a dispensed product 908 in the retrieval bin 708.

Then, the IR sensor 912 which may be placed at a bottom area of the dispensing system 100 may start detecting for a presence or absence of the dispensed product 908. If the IR sensor 912 detects the presence of dispensed product 908, the system controller may send a response to the software application that the product has been dispensed successfully, and the system controller may instruct the IR sensor 912 to cease detecting. If the IR sensor 912 does not detect any presence of the dispensed product 908 within $n_2$ seconds of detection, a jammed item release technique may be initiated. In examples where dispensing multiple products is performed, an algorithm may be deployed for calculating which product is to be dispensed first and the logical sequence for collecting those dispensed products from the retrieval bin 708.

Upon receiving a response from the system controller that the product has been dispensed successfully, the software application sends a command to the system controller to open the gate 114 to allow access into the retrieval bin 708. For example, the system controller may instruct hardware to energize the gate 114 and associated components 914*a* (e.g., servomotor) and 914*b* (e.g., a solenoid lock) to unlock/open or lock/close the gate. The solenoid lock may be de-energized to a lock position after approx. $n_3$ seconds. Whenever the solenoid lock is energized, the coil in the solenoid receives a pulse of high inrush current which can cause the coil to overheat if energized over a minute. A slider cam of the solenoid lock may allow the gate to return to the closed position, but it may not allow it to move to an open position unless the solenoid lock is energized to the unlock position.

Once the gate 114 is opened, the IR sensor 912 starts detecting whether the dispensed product 908 has been retrieved by the customer.

If the customer has retrieved the product, the IR sensor 912 may detect the absence of the product 908 in the dispensed area and the system controller confirms by sending a response to the software application that the product 908 has been picked up by the customer.

The system controller may also instruct the IR sensor 912 to cease detection as the dispensed product 908 has been retrieved and the power supply to IR sensor 912 may be turned off. Upon receiving a response from the system controller that the product 908 has been retrieved by the customer, the software application sends a command to the system controller to close the gate 114. The system controller may instruct the hardware to close the gate 114 (i.e., the servomotor is de-energized to close the gate 114). Upon receiving a response from the controller that the gate 114 is closed, the software application sends a reset position command to the system controller to return the xy-mechanism 910 to the calibration position.

Upon receiving the reset position command from the software application, the system controller may instruct the hardware to move the xy-mechanism 910 (from the current location of the last selected product) to the calibration position. The pulse values for the x-axis device and the y-axis device for moving the xy mechanism 910 to a calibration position may be calculated based on the value of the most recent x and y coordinates stored in the system controller.

Upon receiving a response from the system controller that the xy-mechanism 910 is returned to calibration position, the software application may send a command to the system controller to close the cover 900 (e.g., communication with a sensor 916 and the motor 902). The software application may receive a response from the system controller that the cover 900 is moved to a closed position. The aforementioned exemplary sequence may complete a vend cycle operation for dispensing a single product.

In certain examples, a jammed item release technique may utilize a multi-stage sequence for releasing a jammed item from the dispensing system. During Stage 1, the system controller may instruct the dispensing device (e.g., the extendable member 310 shown on FIG. 10), to push the jammed product. The dispensing device may use the same z motor pulse value received from the software application for pushing the selected product 706 for the second time.

During Stage 2, if the infrared (IR) sensor 912 does not detect any presence of the dispensed product 908 in the retrieval bin 708 after Stage 1, the system controller may instruct the cover 900 to move away from the dispensing passages 702 for $p_1$ pulses and toward the dispensing passages 702 for $p_2$ pulses.

During Stage 3, if the IR sensor 912 does not detect any presence of the dispensed product after Stage 2, the system controller may instruct the cover 900 to move away from the dispensing passages 702 for $p_1$ pulses, and the dispensing device to push the selected product 706 again for a third time while simultaneously moving the cover 900 toward the dispensing passages 702 for $p_2$ pulses.

If the IR sensor 912 does not detect any presence of the dispensed product 908 after Stage 3, the system controller transmits a machine failure response to the software application and may instruct hardware to open the gate 114. Upon receiving this response, the software application may display a Yes/No pop-up message to verify if the product has been retrieved by the customer.

If the customer provides the input as 'yes,' then the system identifies that there could be a possible issue with the IR sensor 912 and may inform a vending management system (VMS). If the customer provides the input as 'no,' then the software application may inform the VMS to initiate relevant formalities as the customer did not receive the selected product.

Upon receiving the above-mentioned feedbacks from the software application, the system controller may instruct the hardware to close the gate 114. If the IR sensor 912 detects the presence of the dispensed product 908 after occurrence of any of the three stages mentioned above, the system controller may send a response to the software application indicating that the product 908 has been dispensed successfully.

Figure 11A:
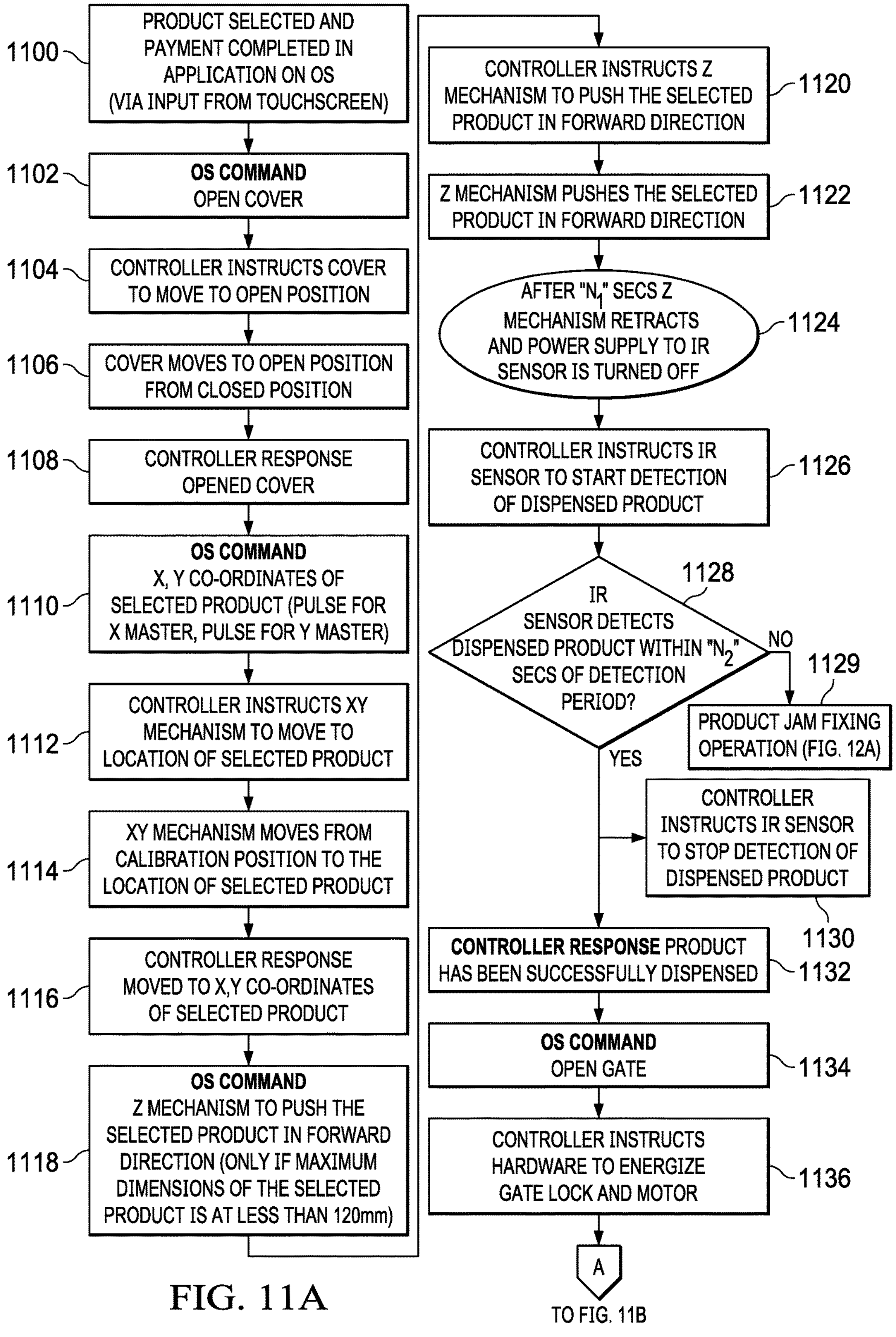
FIGS. 11A and 11B illustrate an operative dispensing sequence, in accordance with examples of the present disclosure.
Figure 11B:
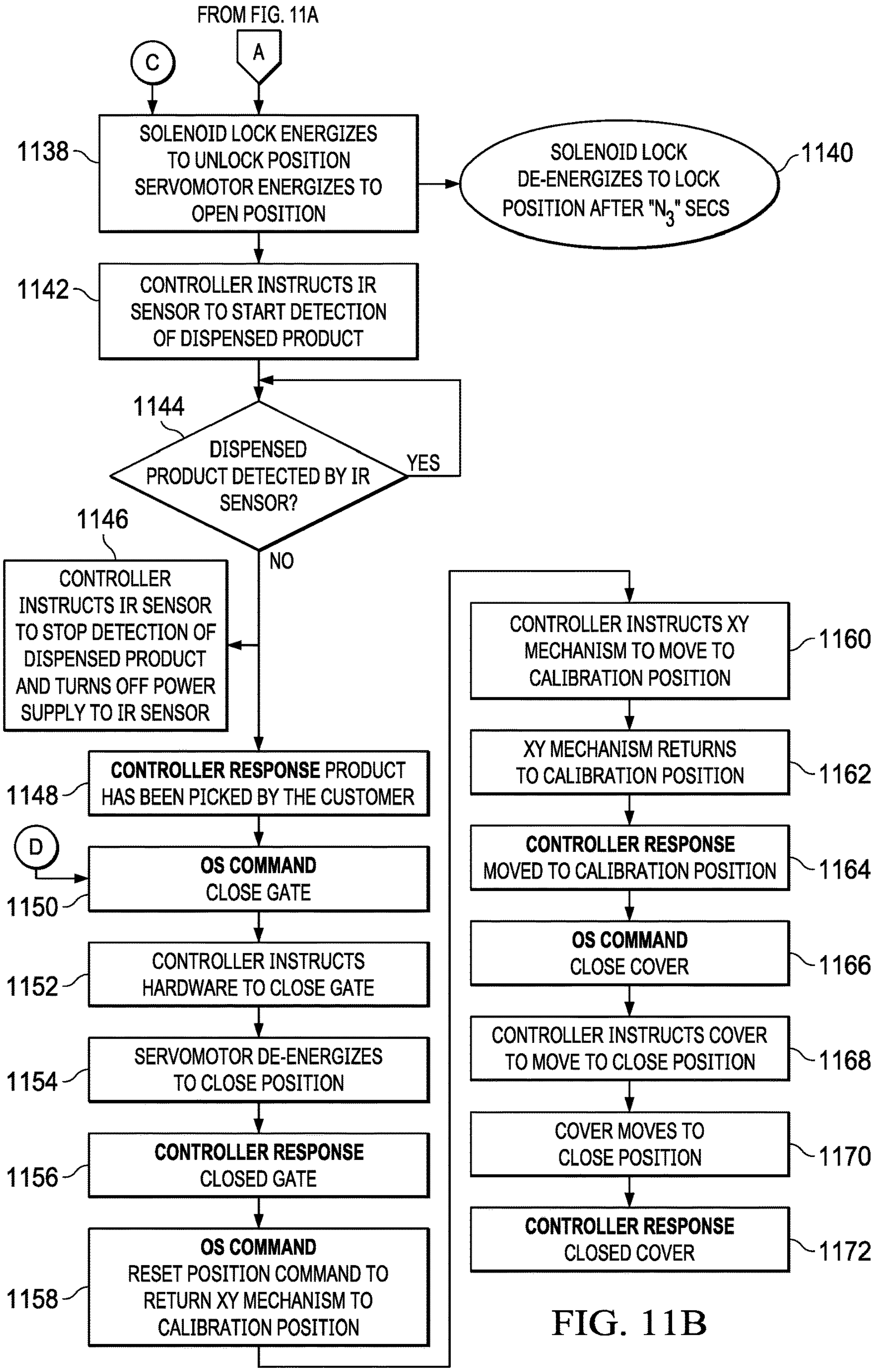

FIGS. 11A and 11B illustrate an exemplary dispensing workflow in accordance with examples of the present disclosure. At step 1100, a product (e.g., the product 706 shown on FIG. 7) and a payment is completed in a software application on an operating system (OS) via an input from a touch screen (e.g., the display unit 117 shown on FIG. 1). At step 1102, an OS may command (e.g., transmit signal) to the system controller (e.g., the system controller 116 shown on FIG. 1) to open the cover (e.g., the cover 900 (door or panel) shown on FIG. 9). At step 1104, the system controller commands the cover to open. At step 1106, the cover moves to the open position from the closed position. At step 1108, the system controller response includes opening the cover. At step 1110, an OS command may include x and y coordinates of the selected product (e.g., a pulse for an x-axis device and/or a y-axis device shown on FIGS. 9 and 10). At step 1112, the system controller commands the xy-mechanism (e.g., the xy-mechanism 910 shown on FIG. 9) to move to the location of the selected product. At step 1114, the xy-mechanism moves from a calibration position to the location of the selected product. At step 1116, the system controller response includes confirmation of move. At step 1118, the OS command includes commanding a dispensing device (e.g., the dispensing device 210 shown on FIG. 2) to push the selected product (e.g., if maximum dimension constraint/threshold is satisfied). At step 1120, the system controller instructs the dispensing device to push the selected product. At step 1122, the dispensing device pushes the selected product. At step 1124, after $n_1$ seconds, the dispensing device retracts and the power supply to the to the IR sensor is turned ON (e.g., the IR sensor 912 shown on FIG. 9). At step 1126, the system controller commands the IR sensor to initiate detection of the dispense product. At step 1128, the IR sensor detects the dispensed product within $n_2$ seconds of a detection period. As shown on FIG. 11B, after step 1128, in some examples, step 1129 may occur which includes a product jam release/fix operation.

In other examples, after step 1128, step 1130 may occur: the system controller instructs the IR sensor to cease detection. At step 1132, the system controller response may include confirmation that the product has been successfully dispensed. At step 1134, the OS command may include open the gate (e.g., the gate 114 shown on FIG. 1). At step 1136, the system controller instructs hardware (e.g., the components 914*a* and 914*b* shown on FIG. 9) to energize a solenoid lock (e.g., the component 914*b* shown on FIG. 9) and motor (e.g., the component 914*a* shown on FIG. 9).

As shown on FIG. 11B, at step 1138, the solenoid lock (e.g., the component 914*b* shown on FIG. 9) energizes to an unlock position and the servomotor (e.g., the component 914*a* shown on FIG. 9) to an open position. At step 1140, the solenoid lock de-energizes to a lock position after $n_3$ seconds. At step 1142, the system controller instructs the IR sensor to initiate detection of the dispensed product. At step 1144, confirmation that the product has been dispensed, occurs. At step 1146, a system controller response may include confirmation that the product has been retrieved by the customer. At step 1148, the system controller instructs the IR sensor to cease detection of the dispensed product and turns off the power supply to the IR sensor. At step 1150, the OS may command the gate to close. At step 1152, the system controller instructs the gate to close. At step 1154, the servomotor may de-energize to a closed position. At step 1156, the system controller response may include confirmation of the gate closure.

After step 1128, step 1158 may occur which includes an OS command that includes a reset position command to return the xy-mechanism to a calibration position. At step 1160, the system controller may instruct the xy-mechanism to move to the calibration position. At step 1162, the xy-mechanism returns to the calibration position. At step 1164, the system controller response includes confirmation that the cover is closed. At step 1166, the OS commands the cover to close. At step 1168, the system controller instructs the cover to close. At step 1170, the cover closes. At step 1172, the system controller response includes confirmation that the cover is closed.

Figure 12A:
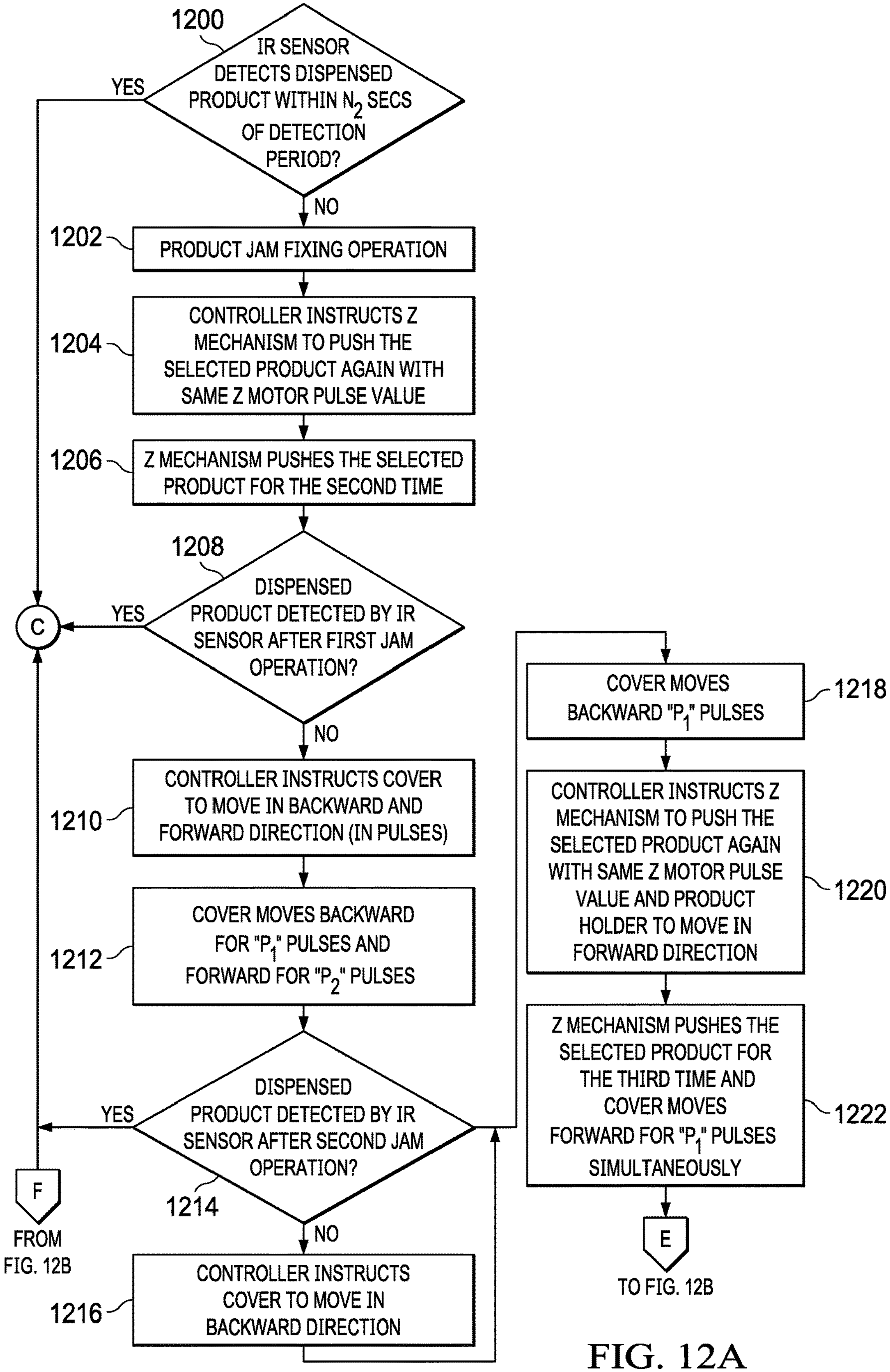
FIGS. 12A and 12B illustrate an operative jammed item release sequence, in accordance with examples of the present disclosure.
Figure 12B:
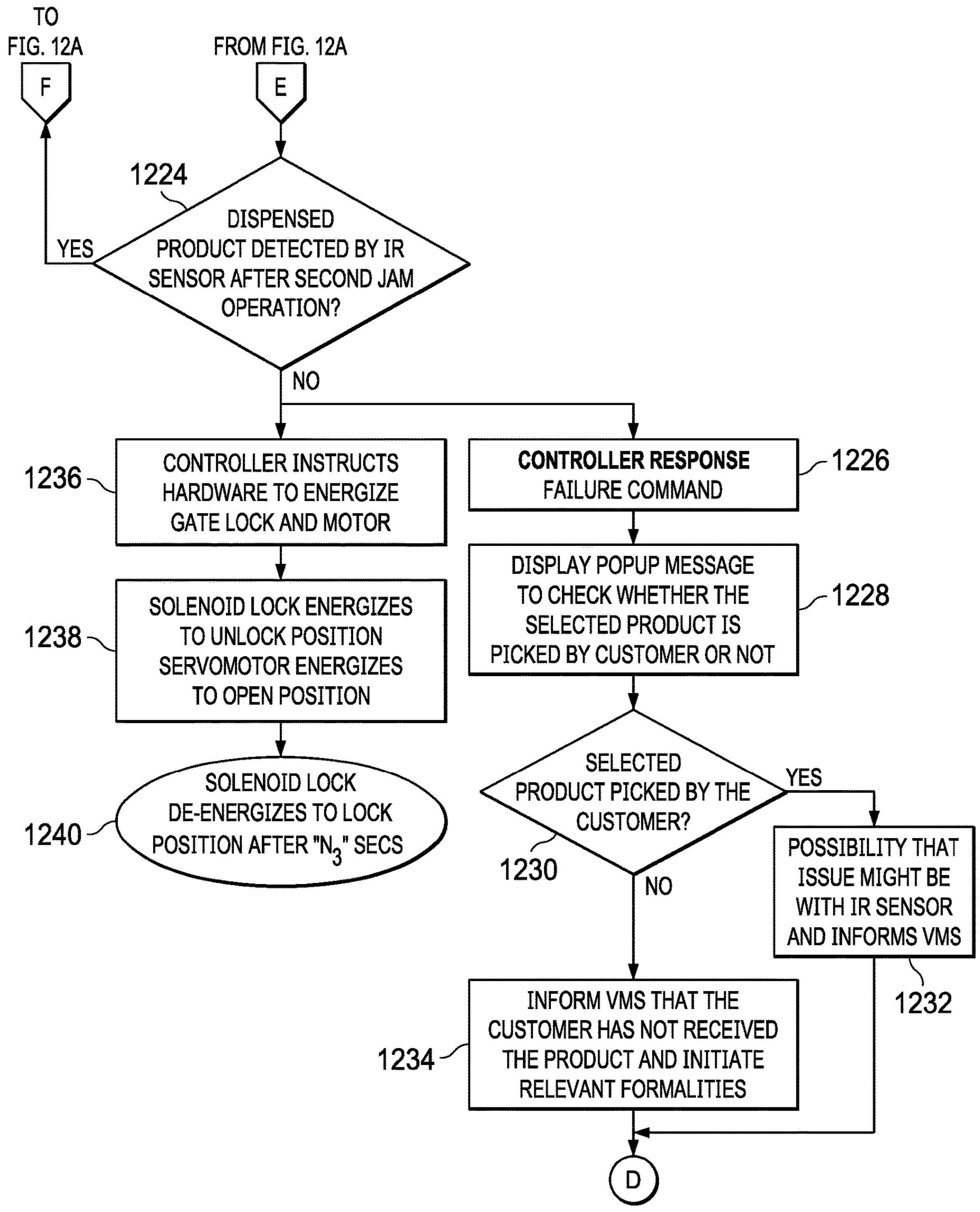

FIGS. 12A and 12B illustrate an exemplary jammed product release technique, in accordance with examples of the present disclosure. At step 1200, the IR sensor (e.g., the IR sensor 912 shown on FIG. 9) may detect a dispensed product (e.g., the product 908 shown on FIG. 7) within $n_2$ seconds of a detection period. At step 1202, a product jam release operation/fixing may commence. At step 1204, the system controller (e.g., system controller 116 shown on FIG. 1) instructs the dispensing device (e.g., the member 310 shown on FIG. 3) to push the selected product again with the same z motor (e.g., the motor 304 shown on FIG. 3) pulse value. At step 1206, the dispensing device pushes the selected product a second time. At step 1208, confirmation that the dispensed product is detected by the IR sensor after the first jam release operation occurs. At step 1210, the system controller instructs the cover (e.g., the cover 900 shown on FIG. 9) to move back and forth in axial directions in pulses. At step 1212, the cover moves backward for $p_1$ pulses and forward for $p_2$ pulses. The number of pulses may be the same or different. At step 1214, confirmation that the dispensed product is detected by the IR sensor after the second jam operation occurs. At step 1216, the system controller instructs the cover to move in a backward direction. At step 1218, the cover moves backward $p_1$ pulses. At step 1220, the system controller instructs the dispensing device to push the selected product again with the same z motor pulse value and cover to move in a forward direction. At step 1222, the dispensing device pushes the selected product for a third time and the cover moves forward for $p_2$ pulses simultaneously. At step 1224, the dispensed product may be detected by the IR sensor after the second jam operation. At step 1226, the system controller response includes a failure command. At step 1228, a display pop-up message to confirm retrieval of the product by the customer may occur. At step 1230, confirmation of the retrieval of the product occurs. At step 1232, VMS may be informed by the system controller that the customer has not received the product and initiate relevant formalities. At step 1234, the system controller informs VMS that there may be an issue with the IR sensor.

In some examples, after step 1224, step 1236 may occur: the system controller instructs energization of the gate 114 and associated components. At step 1238, the solenoid lock (e.g., lock 914*b* shown on FIG. 9) energizes to unlock position and the servomotor (e.g., motor 914*a* shown on FIG. 9) energizes to an open position. At step 1240, the solenoid lock de-energizes to the lock position after $n_2$ seconds.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

What is claimed is:

1. A dispensing system comprising:

at least one passage;

at least one device configured to dispense a product from the at least one passage; and a cover in a closed position configured to prevent release of the product from the at least one passage, the cover in an open position further configured to allow dispensing of the product from the at least one passage, wherein the cover is disposed in front of the at least one passage in both the open and closed positions, and wherein the cover extends vertically across a plurality of passages comprising the at least one passage.

2. The dispensing system of claim 1, wherein the cover is directly adjacent to and flush with respective openings of the at least one passage in the closed position.

3. The dispensing system of claim 1, wherein the cover includes a motor.

4. The dispensing system of claim 3, wherein the cover is configured to move away from the at least one passage via the motor, to open the passage for product dispensing.

5. The dispensing system of claim 3, wherein the cover is configured to move toward the at least one passage via the motor, to close the at least one passage after product dispensing.

6. The dispensing system of claim 1, wherein the at least one passage includes a plurality of passages.

7. The dispensing system of claim 6, wherein the cover is configured to open or close all of the passages.

8. The dispensing system of claim 1, wherein the cover is configured to move simultaneously with the at least one device.

9. The dispensing system of claim 1, further comprising a system controller configured to control movement of the at least one device and the cover.

10. A method comprising:

controlling movement of components of a dispensing system, the dispensing system including:

at least one passage; and the components, the components including at least one device configured to dispense a product from the at least one passage; and a cover configured to close to prevent release of the product from the at least one passage, the cover further configured to open to dispense the product from the at least one passage, wherein the cover is positioned in front of the at least one passage both when the cover is open and closed, and wherein the cover extends vertically across a plurality of passages comprising the at least one passage.

11. The method of claim 10, further comprising moving the cover away from the at least one passage to open the at least one passage for product dispensing.

12. The method of claim 10, further comprising moving the cover toward the at least one passage to close the at least one passage after product dispensing.

13. The method of claim 10, further comprising extending a member of the at least one device into the at least one passage during dispensing, wherein the cover is positioned to allow dispensing of the product from the passage.

14. The method of claim 10, further comprising moving the cover and the at least one device simultaneously to dispense the product.

15. The method of claim 10, further comprising opening the passage to create space for the product to drop from the at least one passage during dispensing.

16. The method of claim 10, wherein the at least one passage includes a plurality of passages.

17. The method of claim 16, wherein the plurality of passages includes products for selection.

18. The method of claim 10, further comprising closing the at least one passage with via a motor coupled to the cover.

19. The method of claim 10, further comprising opening the at least one passage with via a motor coupled to the cover.

* * * * *